Dec. 21, 1926.
R. C. LUPLOW
1,611,757
SWITCH FOR VEHICLE SIGNALING SYSTEMS
Original Filed Feb. 2, 1923
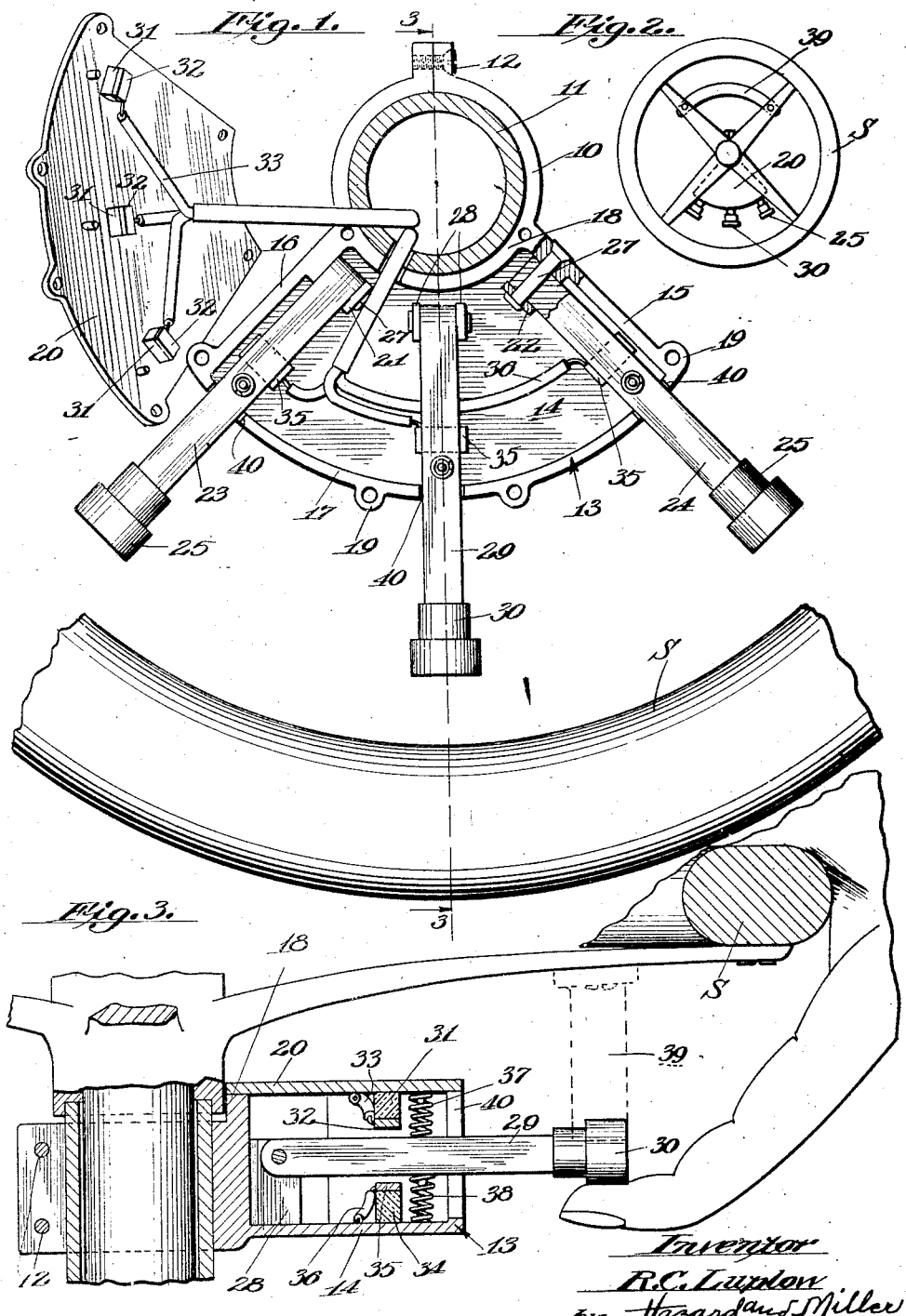

Patented Dec. 21, 1926.

1,611,757

UNITED STATES PATENT OFFICE.

RONALD C. LUPLOW, OF ADAMS SPRINGS, CALIFORNIA.

SWITCH FOR VEHICLE SIGNALING SYSTEMS.

Original application filed February 2, 1923, Serial No. 616,525. Divided and this application filed October 29, 1924. Serial No. 746,539.

This invention is a division of the subject matter disclosed in my co-pending application Serial No. 616,525 filed Febr. 2, 1923.

An object of this invention is to provide a switch for controlling electric current adapted to energize a vehicle signal.

A further object of this invention is to provide means carried by the steering wheel of a vehicle which will actuate the switch upon rotating the steering wheel.

With the foregoing and other objects in view which will be made manifest in the following detailed description and pointed out in the appended claim, reference is had to the accompanying drawings for an illustrative embodiment of the invention, wherein:

Figure 1 is a section taken through the steering post to which the improved switch has been applied.

Fig. 2 is a top plan view of a steering wheel showing the improved switch in applied position, and Fig. 3 is a section taken substantially on the line 3—3 of Fig. 2.

Referring to the accompanying drawings wherein similar reference characters designate similar parts throughout, the improved switch consists of a split collar 10 adapted to be clamped about the steering post 11 of a vehicle steering apparatus by means of a screw 12. A casing 13 is formed integral with the collar 10 and is sector-shaped in form, having a bottom 14, radial side walls 15 and 16, a curved front wall 17, and a curved rear wall 18, which rear wall rests against the steering post and is concentric with respect to the front wall 17.

Suitable bosses 19 may be formed upon the walls of the casing 13 adapted to receive screws for holding a removable cover 20 in position upon the casing. Bosses 21 and 22 are formed upon the bottom 14 adjacent the radial side walls 16 and 15 respectively, and radial switches 23 and 24 carrying insulating handles 25 are pivoted between the bosses 21 and 22 and the side walls 16 and 15 by means of pins 27. A pair of bosses 28 are formed upon the bottom 14 to which is pivoted a switch 29 carrying an insulating handle 30. It will be noted that the switches 23, 24 and 29 are radially arranged with respect to the steering post 11.

Three insulating blocks 31 are mounted upon the under side of the cover 20 and carry contact pieces 32 to which wires 33 may be connected. Similar insulating blocks 34 are mounted upon the bottom 14 of the casing 13 and carry contact pieces 35 to which wires 36 may be connected. A pair of coil springs 37 and 38 is interposed between the top 20 and the bottom 14 of the casing and each of the switches 23, 24 and 29, and as shown in Fig. 3 these springs serve to maintain the switches in normal disengaged position with respect to the contact pieces 32 and 35.

It will be understood that the switch 23 upon engaging its respective contact piece 32 is adapted to actuate a vehicle signal so as to indicate a left turn. In a similar manner when the switches 29 and 24 engage their respective contact pieces 32, these switches will close a circuit so as to energize the signal to indicate "stop" and right turn respectively. When the signal has been set by causing either of the switches 23, 24 or 29 to engage its respective contact 32, it is then necessary that a separate circuit be closed which will cause the signal to return to its original position. To close this separate circuit for resetting the signal, either of the switches 23, 24 or 29 is caused to engage its respective contact piece 35. As shown in Fig. 3, the hands of the driver may easily and readily depend from the steering wheel S so as to engage either of the switches and swing it upwardly against the action of its respective spring 37 so as to engage its respective contact piece 32, causing the setting of the signal.

The resetting of the signal may be accomplished in either of two manners. The hand of the driver may be passed beneath the steering wheel S and cause the switch which last actuated the signal to be pressed downwardly so as to engage its respective contact 35. An alternative method for causing the switches 23, 29 and 24 to engage their respective contacts 35 is to provide an arcuate cam shaped member 39 secured to the spokes of the steering wheel S. When either of the right or left turn switches have been actuated upon turning the vehicle in the direction preferably indicated, the steering wheel is rotated and the cam element 39 will be caused to engage the switches forcing them downwardly against their contacts 35 and thus causing resetting of the signal upon the turning of the steering wheel S. The ends of the switches 23, 24 and 29 extend through the front wall 17 of the casing 13 through slots 40 formed therein.

It will be understood that various changes may be made in the detail of construction without departing from the spirit or scope of the invention as defined by the appended claim.

I claim:

A switch for vehicle signals comprising a collar adapted to be secured about a steering post, a casing secured to said collar, two contacts pivoted within said casing and extending outwardly therefrom, second contacts engageable by the first contacts whereby right and left signals may be operated, a cam secured to the steering wheel engageable with either of said switches upon steering the steering wheel to the right or the left respectively, and spring means for disengaging the pivoted contacts from said contacts after they have been disengaged from the cam.

In testimony whereof I have signed my name to this specification.

RONALD C. LUPLOW.